Patented Apr. 6, 1943

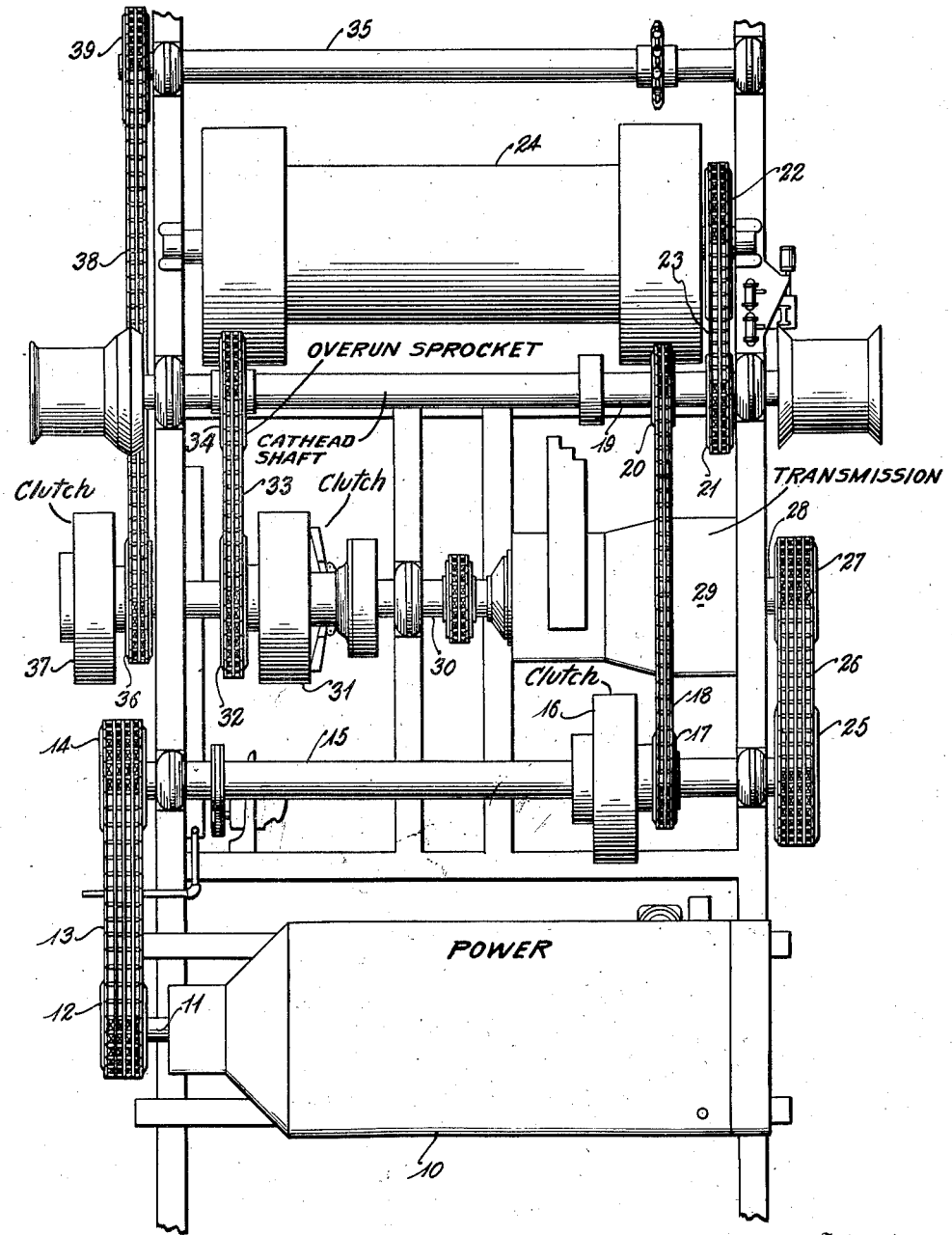

2,316,131

UNITED STATES PATENT OFFICE 2,316,131

MULTISPEED DRIVE

Harland W. Cardwell, Wichita, Kans., assignor to Cardwell Manufacturing Company, Inc., Wichita, Kans., a corporation of Kansas Application March 15, 1941, Serial No. 383,618

6 Claims. (Cl. 74—217)

The present invention relates to a multi-speed drive and is particularly adapted to a rotary drilling machine.

The present invention provides a multi-speed drive for the drum or cathead shaft of a rotary drilling machine. More particularly the present invention provides means for driving the drum or cathead shaft at a plurality of speeds and also provides for the instantaneous change from one speed to another without the necessity of stopping either the drum or the cathead shaft or of shifting gears.

It is an object of the present invention to provide a rotary drilling machine with an improved drive.

It is another object of the present invention to provide a rotary drilling machine with means for instantaneously changing the speed of rotation of the drum or cathead shaft.

It is another object of the present invention to provide a multi-speed drive for a shaft and means for instantaneously changing the speed of the shaft.

These and other objects of the present invention will be apparent to those skilled in the art from a description of the drawing, which is a plan view of an embodiment of the invention as applied to a rotary drilling machine.

In the figure, 10 represents the power supply equipped with a power takeoff shaft 11 on which is fixedly mounted sprocket 12. Chain 13 passing over sprocket 12 drives sprocket 14 fixedly mounted on a driving shaft 15. Clutch 16 is keyed to shaft 15 and, when engaged, is adapted to drive sprocket 17 rotatably mounted on the shaft 15. Chain 18 driven by sprocket 17 drives a driven shaft 19 by means of sprocket 20 fixedly mounted thereon. Sprocket 21 fixedly mounted on shaft 19 drives sprocket 22 by means of chain 23. The drum 24 may be driven by sprocket 22 through suitable clutching means (not shown).

The above described drive permits the rotation of the cathead or driven shaft 19 and the drum 24 at a high speed ratio. The following is a description of means for driving shaft 19 and drum 24 at a plurality of lower speeds. Sprocket 25 fixedly mounted on shaft 15 drives chain 26 and sprocket 27 fixedly mounted on the transmission input shaft 28 of the transmission 29. The transmission output shaft 30 is an intermediate shaft between the driving shaft 15 and the driven shaft 19 when the drive shaft is through the transmission 29 and has clutch 31 fixedly mounted thereon and adapted, when engaged, to drive sprocket 32 rotatably mounted on shaft 30. Chain 33 driven by sprocket 32 drives the overrun sprocket 34, mounted on shaft 19, the details of which form no part of the present invention and which may be of conventional design.

The rotary shaft 35 may be driven from transmission output shaft 30 by means of sprocket 36 rotatably mounted on shaft 30 and adapted to be driven by means of clutch 37 fixedly mounted on the transmission output shaft. Chain 38 and sprocket 39 complete the rotary drive.

It will be apparent that by disengaging clutch 16 and engaging clutch 31, shaft 19 and drum 24 may be rotated at any of the plurality of speeds provided for in the transmission 29. The selection of a particular speed in transmission 29 may be accomplished while shaft 19 is being driven by clutch 16, so that the change from one drive to the other may be instantaneous. In many instances, however, the transmission 29 may be left in a particular gear ratio for a particular operation. In such instances the rapid change from the selected speed to the high speed and back again may be made by rapidly engaging and disengaging the proper clutches.

When the shaft 19 is being driven at high speed through clutch 16, it is possible to rapidly disengage clutch 16 and to engage clutch 31, thus permitting an instantaneous change in the speed with which shaft 19 is being driven without the necessity of stopping to shift gears. The overrun sprocket 34 allows shaft 19 to decrease its speed gradually until it is the same as that of sprocket 34 at which time sprocket 34 will automatically engage and continue to drive shaft 19 at the reduced speed.

When it is desired to increase the speed of shaft 19 it is possible to rapidly disengage clutch 31 and rapidly engage clutch 16. The high speed drive immediately becomes effective and sprocket 34 is allowed slowly to come to rest.

In order to provide ease of shifting from one speed to another it is preferred that clutches 16 and 31 be of the type actuated by liquid or air pressure. Then by means of a conventional valve which in one position permits actuation of one clutch while insuring disengagement of the other and in another position permits engagement of the second clutch while insuring disengagement of the first, it is possible to engage one clutch and at the same time disengage the other by a simple movement of the valve from one position to the other. In addition to providing ease of operation this also insures the engagement of only one clutch at a particular time. The details of the clutch control will be readily understood by those skilled in the art and may be of conventional design.

It will be apparent that the present invention is useful wherever it is desired to rapidly change from one speed to another without the necessity for stopping to shift gears. It is particularly useful, however, in a rotary drilling apparatus in that the shift into high for speedy return of the blocks and the quick shift into any one of the plurality of speeds in the transmission are possible for picking up the drill pipe when lifting off of the slips, without stopping for changing of gears when letting the drill pipe into the well. It has been found that a saving of 10% in time may be made during the pulling and rerunning of the drill pipe.

While various embodiments of the invention have been described, it is to be understood that the invention is not limited thereto but may be varied within the scope of the following claims.

I claim:

1. A power drive comprising a driving shaft, a driven shaft, an intermediate shaft, engageable means for driving said driven shaft directly by said driving shaft, means for driving said intermediate shaft from said driving shaft at any one of a plurality of speeds relative to said driving shaft and means including a clutch and an overrun device between said intermediate shaft and said driven shaft for driving said driven shaft by said intermediate shaft.

2. A power drive comprising a driving shaft, a driven shaft, a multiple speed transmission having an input shaft and an output shaft and means for driving said output shaft from said input shaft at any one of a plurality of speeds relative to said input shaft, means including a clutch for driving said driven shaft directly from said driving shaft, means for driving said input shaft by said driving shaft, and means including a clutch and an overrun device between said output shaft and said driven shaft for driving said driven shaft by said output shaft.

3. A power drive comprising a driving shaft, a driven shaft, a multiple speed transmission having an input shaft and an output shaft, a direct drive connecting said driving shaft and said driven shaft, a clutch on said driving shaft to engage said direct drive, an overrun device on said driven shaft, a drive connecting said output shaft and said overrun device and a clutch on said output shaft to engage said last mentioned drive.

4. A rotary drilling machine comprising a drive shaft, a driven shaft, a rotary shaft, a multiple speed transmission having an input shaft and an output shaft, a direct drive connecting said driving shaft and said driven shaft, a clutch on said driving shaft to engage said direct drive, an overrun device on said driven shaft, a drive connecting said output shaft and said overrun device, a clutch on said output shaft to engage said last mentioned drive, a rotary drive connecting said rotary shaft and said output shaft, and a clutch on said output shaft to engage said rotary drive.

5. A power drive comprising a driving shaft, a driven shaft, a change speed device, intermediate shaft, means for connecting said change speed device between said driving shaft and said intermediate shaft for driving said intermediate shaft from said driving shaft through said change speed device, means including a clutch and an overrun device between said intermediate shaft and said driven shaft for driving said driven shaft from said intermediate shaft, and means for connecting said driving shaft to said driven shaft for driving said driven shaft from said driving shaft independently of said change speed device.

6. A power drive comprising a driving shaft, a driven shaft, a change speed device, intermediate shaft, means including a clutch for connecting said change speed device between said driving shaft and said intermediate shaft for driving said intermediate shaft from said driving shaft through said change speed device, means including a clutch and an overrun device between said intermediate shaft and said driven shaft for driving said driven shaft from said intermediate shaft, means including a clutch for connecting said driving shaft to said driven shaft for driving said driven shaft from said driving shaft independently of said change speed device.

HARLAND W. CARDWELL.